W. M. COMBES.
Steam Feed-Cooker.
No. 209,659. Patented Nov. 5, 1878.
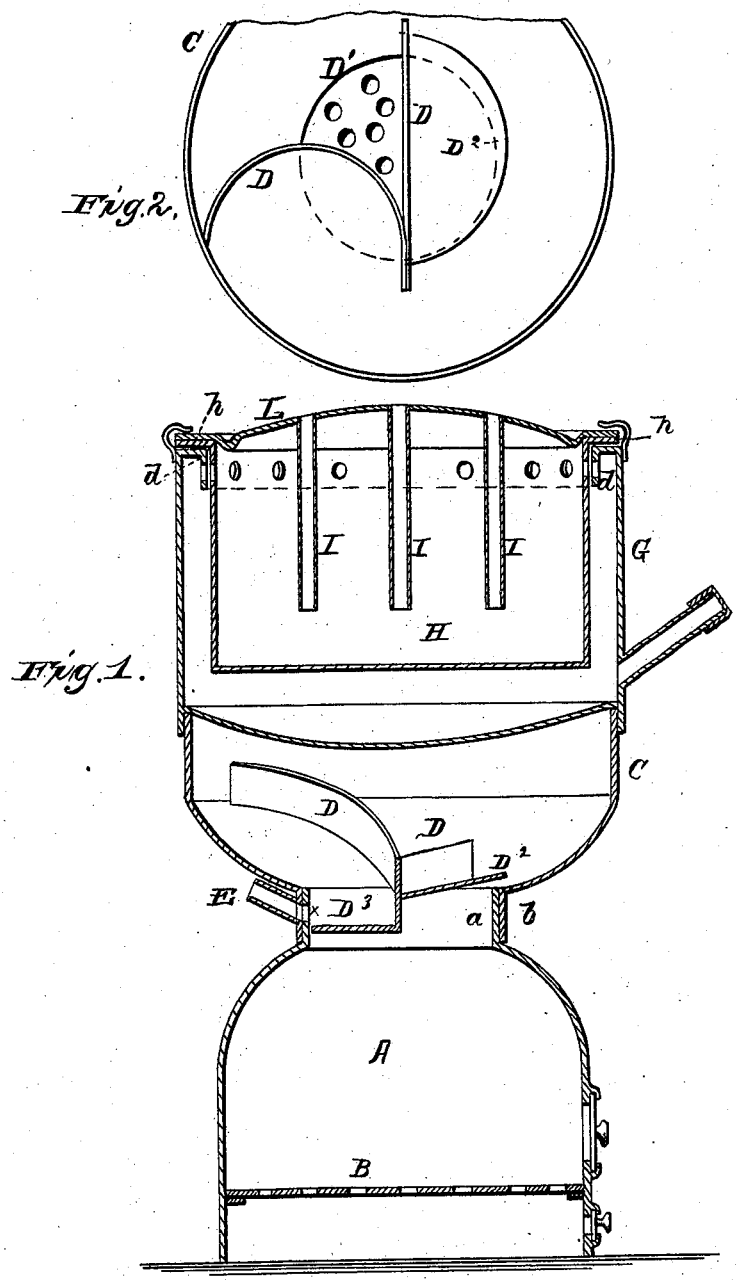

UNITED STATES PATENT OFFICE.

WILBER M. COMBES, OF AUBURN, NEW YORK.

IMPROVEMENT IN STEAM FEED-COOKERS.

Specification forming part of Letters Patent No. 209,659, dated November 5, 1878; application filed August 23, 1878.

*To all whom it may concern:*

Be it known that I, WILBER M. COMBES, of Auburn, in the county of Cayuga, and in the State of New York, have invented certain new and useful Improvements in Steam Feed-Cookers; and do hereby declare that the following is a full, clear, and exact description thereof, reference being had to the accompanying drawings, and to the letters of reference marked thereon, making a part of this specification.

The nature of my invention consists in the construction and arrangement of a steam feed-cooker, as will be hereinafter more fully set forth.

In order to enable others skilled in the art to which my invention appertains to make and use the same, I will now proceed to describe its construction and operation, referring to the annexed drawings, in which—

Figure 1 is a central vertical section of my steam feed-cooker. Fig. 2 is a plan view of the fire-pot.

A represents the fire-pot, provided with a grate, B, and having its upper portion somewhat in dome shape, with an upwardly-projecting collar, $a$, on which is placed the case or thimble C. This case or thimble is made somewhat in inverted-dome shape, with a collar, $b$, at the bottom to fit around the collar $a$ of the fire-pot. The smoke-pipe E extends from the collar $b$, and a corresponding opening, $x$, is made in the collar $a$, as shown.

In the bottom of the case C are arranged flanges D D, dividing the opening, as it were, in three parts. One part, $D^1$, is left open for the passage of the heat and smoke, while another part has an inclined lip, $D^2$, to retard the passage of the heat and smoke. The third part is entirely closed, forming a flue, $D^3$, leading to the smoke-pipe. The products of combustion, passing up into the case C, are, by this construction, caused to whirl and eddy therein, so as to heat the kettle placed thereon, and then pass through the flue $D^3$ into the exit-pipe E.

On the top of the case C is placed a kettle, G, having at its upper end a flange, $d$, extending inward and then downward, the downward portion of the flange being perforated, as shown. Within the kettle G is placed another kettle, H, having a circumferential flange, $h$, around its upper edge, by which said kettle is supported on the flange $d$ of the outer kettle, G. The inner kettle, H, is perforated near the upper edge to correspond with the perforations in the flange $d$.

The kettle H is provided with a cover, L, from which depend tubes I I, extending down into the kettle, as shown.

The water to generate steam is put in the kettle G, and the food to be cooked in the kettle H. The steam then passes through the perforations at the top into the inner kettle, down through the food, and escapes through the pipes I.

The fire-pot A and case C are intended to be made of cast-iron, and the kettles G H of galvanized iron.

Having thus fully described my invention, what I claim as new, and desire to secure by Letters Patent, is—

1. The case or thimble C, provided with the collar $b$, having smoke-pipe E, the flanges D D, lip $D^2$, and flue $D^3$, in combination with the fire-pot A, provided with the collar $a$, having perforation $x$, substantially as and for the purposes herein set forth.

2. The cover L, with pipes I, in combination with the kettles H G, having perforations, as described, substantially as and for the purposes herein set forth.

In testimony that I claim the foregoing I have hereunto set my hand this 20th day of July, 1878.

W. M. COMBES.

Witnesses:
CHARLES L. ADAMS,
CHARLES B. NICHOLS.